United States Patent

[11] 3,617,132

[72] Inventor Robert C. Bell
East Setauket, L.I., N.Y.
[21] Appl. No. 849,282
[22] Filed Aug. 5, 1969
[45] Patented Nov. 2, 1971
[73] Assignee Beltronix System, Inc.

[54] APPARATUS UTILIZING LIGHT-CONDUCTING RODS WITH LENSES FOR PROVIDING A REMOTE INDICATION OF THE AMOUNT OF MAGNETIC RECORDING TAPE ON A REEL
2 Claims, 3 Drawing Figs.

[52] U.S. Cl. .................................................. 356/156,
250/219 L, 250/219 WD, 356/159
[51] Int. Cl. ........................................................G01b 11/00,
G01b 11/04, G01b 11/10
[50] Field of Search.......................................... 250/227,
219 WD, 219 DF, 219 L; 350/96; 356/156, 159

[56] References Cited
UNITED STATES PATENTS

| | | | |
|---|---|---|---|
| 2,324,304 | 7/1943 | Katzman | 250/227 |
| 3,045,223 | 7/1962 | Kapany et al. | 250/227 |
| 1,794,557 | 3/1931 | Symonds | 350/96 X |
| 2,554,580 | 5/1951 | Le Goff | 350/96 X |
| 2,589,569 | 3/1952 | Peter et al. | 350/96 X |
| 2,623,313 | 12/1952 | Fuchs | 350/96 X |
| 3,060,319 | 10/1962 | Gruenke | 350/96 X |
| 3,123,066 | 3/1964 | Brumley | 350/96 X |
| 3,197,645 | 7/1965 | Sperry | 250/219 |

*Primary Examiner*—James W. Lawrence
*Assistant Examiner*—T. N. Grigsby
*Attorney*—William W. McDowell, Jr. and Kenneth E. Prince ABSTRACT: Measuring device including a pair of spaced-apart, normally light-transmitting rods or bars, each having a light-reflecting coating at one end and throughout a major portion of their respective longitudinal surface areas, thereby defining relatively narrow longitudinal light-transmitting areas in each rod or bar facing the like area in the other rod or bar; means for producing and transmitting light into the uncoated end of the first rod or bar; and means sensing the relative amount of light reflected and transmitted out of the uncoated end of the second rod or bar. The device is especially adaptable for use as a remote indicating footage meter for reels of magnetic recording tape, magnetic data-processing tape or the like located between the two rods or bars, by electrically connecting the light sensing means, preferably through an amplifier, to a remote meter or the like which gives a visual indication of the relative amount of light sensed by the sensing means as the tape is wound or unwound in the space between the rods or bars.

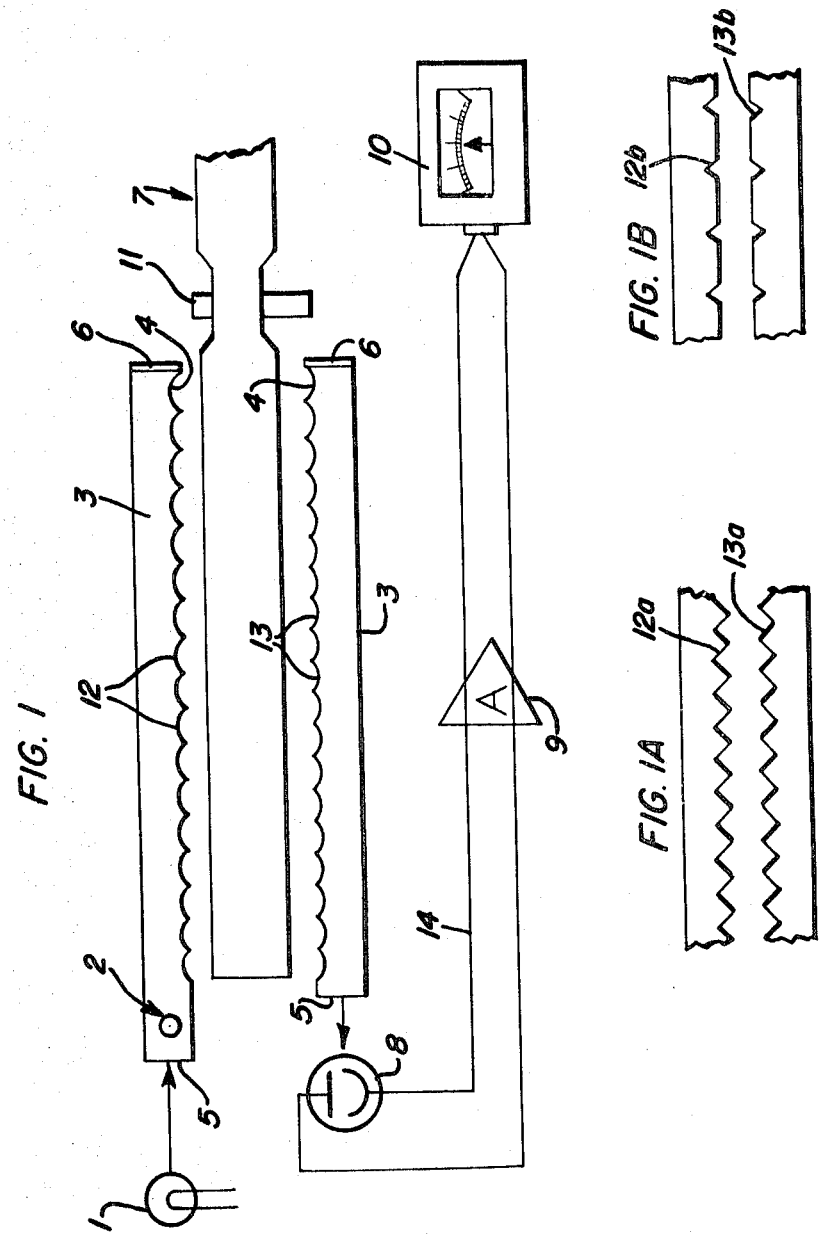

APPARATUS UTILIZING LIGHT-CONDUCTING RODS WITH LENSES FOR PROVIDING A REMOTE INDICATION OF THE AMOUNT OF MAGNETIC RECORDING TAPE ON A REEL

MEASURING DEVICE

This invention relates to a measuring device. In particular it relates to a device which senses the relative amount of light transmitted across a space between two especially constructed, normally light-transmitting rods or bars in proportion to the amount of material interposed in the space. In the presently preferred embodiment the light-sensing means generates an electrical signal and is electrically connected to a meter, located at any convenient place, which gives a visual indication of the strength of the signal and thusly an indication of the amount of material located within the measuring device.

The essential and the preferred apparatus elements forming the device of this invention and the way in which these elements are combined will be more fully understood from reference to the following more detailed description of one presently preferred embodiment thereof. In this embodiment the device is used in a footage meter providing a remote indication of the relative footage, e.g., recording tape remaining on or dispensed from a reel of such tape. It will be understood that the device may be adapted to a number of other uses, and that the following detailed description and accompanying drawing illustrating one specific presently preferred embodiment thereof is presented for purposes of illustration and description only.

In the drawing:

The single FIGURE is a schematic view, predominantly in elevation, illustrating the construction and operation of the device of this invention in an adaptation for use as a magnetic tape footage meter; FIGS. 1A and 1B illustrating variations of design.

As shown in the FIGURE, the reference number 7 indicates the side view of a reel or spool of magnetic recording tape. The tape has been wound up on the reel from a second feed reel (not shown) by suitable rotation about the axial center post 11 in the usual manner, or is ready for unwinding onto the second reel (not shown). In order to obtain an indication of the relative footage of tape on the reel as it is wound or unwound, a measuring device according to the present invention is provided.

As shown, the measuring device includes a pair of normally light-transmitting rods or bars 3 spaced apart for a sufficient distance to accommodate the tape reel therebetween. Each of the rods or bars 3 in the illustrated device are similar so that description of one is adequate for an understanding of the present invention. As noted the rods or bars are made of normally light-transmitting material such as glass, clear plastic (e.g., "Lucite") or the like. One end of these, e.g., the right-hand end in the illustration shown, is painted or otherwise suitably provided with a light-reflecting, opaque surface 6. This may be a piece of adhesive reflecting tape or a coating of silver or aluminum paint. In any event, the surface 6 acts to reflect light waves incident on the inner surface thereof (i.e., the surface in direct contact with the end of the rod or bar 3) back into the interior body of the rod or bar. The rods or bars 3 are similarly painted or otherwise provided with a light-reflecting, opaque surface throughout a major portion of their respective longitudinal lengths except for a relatively narrow longitudinal area (25 percent or less, preferably 2 to 15 percent, of the total outer longitudinal surface) generally designated at 4 in the drawing. An effective coating, for example, is silver paint. Again this coating serves to reflect incident light back into the interior body of the rods or bars.

The light-transmitting areas 4 of the rods or bars 3 are located in a common plane (a horizontal plane in the device as illustrated in the drawing) and face each other across the spacing between them. Preferably, but not necessarily, these areas 4 are provided with lenses throughout substantially their entire length. As shown, the upper rod or bar has a plurality of convex lenses 12 whereas the lower rod has a plurality of concave lenses 13. Alternate lens shapes may be provided as desired. For example, the areas 4 of the rods could be filed at spaced intervals to provide continuous triangular sawtoothlike lenses (FIG. 1A). Or, as schematically illustrated in FIG. 1B, small cuts may be provided at spaced intervals to form a discontinuous gratelike lense pattern.

One end, 5, of the rods or bars 3 is left uncoated, together with the relatively narrow longitudinal area 4, for transmission of light in the normal manner. It will be understood that the coated ends 6 and uncoated ends 5 of the respective rods or bars need not be located at the same ends (the right- and left-hand ends, respectively, as illustrated in FIG. 1).

Near the uncoated end of one of the rods or bars 3 there is a source of light, designated as light source 1 near end 5 of the upper rod or bar 3 in the illustrated device. Near the uncoated end of the other rod or bar there is a light-sensing means, designated as photocell sensing means 8 near end 5 of the lower rod or bar 3 in the illustrated device. Again it will be understood that these could be reversed, as desired, so that sensing means 8 is near the uncoated end of the upper rod or bar and light source 1 is near the uncoated end of the lower rod.

In operation, light is transmitted from source 1 into the interior of the upper rod or bar 3, is reflected by surface or coating 6 and the reflecting surface on the longitudinal portion of the rod or bar, and is then transmitted through the relatively narrow area 4 (preferably including lenses 12). The light emanating from area 4 of the upper rod is transmitted through area 4 of the lower rod or bar (preferably including lenses 13), is reflected by surface or coating 6 and the reflecting surface on the remaining longitudinal portion of the lower rod or bar, and is then ultimately transmitted out of the unsurfaced end 5 of the lower rod or bar where it is sensed by sensing means 8. If an object, such as the reeled tape 7, is interposed in the space between the two rods or bars, the amount of light received by the lower rod or bar and sensed by sensing means 8 will decrease in proportion to an increased amount of the object in the space. Thus the amount of light sensed by sensing means 8 provides a measure of the relative amount of an object in the space between the two rods or bars. It will be apparent that the device can be easily calibrated so that the measurement provides a direct indication of the footage of tape 7 as it is built up on a reel or unwound from a reel.

Preferably, sensing means 8 is a photocell or like device which generates an electrical signal proportional to the amount of light sensed. This signal may then be conducted by lead wires 14 to a suitably located meter 10 for visual indication of the measurement made. In many instances it will be desirable to include an amplifier 9 to suitably amplify the electrical signal and thus provide a wider range of indicatable strength of the signals on the meter 10, or alternately, a more precise measurement of the strength.

One advantage of the device of this invention when used as a tape footage measuring device or the like is the ability to locate the indicating meter 10 at any convenient place, even one which is quite remote from the location of the tape and its associated equipment (not shown). Another desirable feature is the capability of measuring the amount of tape dispensed from a reel or, where desired, the amount built up on a reel. In the latter case one needs only to reverse the connection of lead wires 14 to the meter 10 so that lower strength electrical signal output from the sensing means 8 or the intermediate amplifier 9 gives higher indicated readings on the meter.

When incorporated in a tape system such as in a language-teaching system or the like, the device includes means, e.g., pivot pin 2 and associated supports (not shown) permitting movement of at least one of the rods or bars out of the way when a reel of tape 7 is to be replaced with a new reel.

While the invention has been specifically described in relation to one of its presently preferred embodiments, it will be understood that it may be adapted to a number of other specific uses. Moreover, a number of variations and modifications will become obvious to those skilled in the art after studying the enabling description herein. It is therefore intended that the scope of the invention be limited solely by the scope of the appended claims.

What is claimed is:

1. Measuring device comprising, in combination,
   a. a first normally light-transmitting rod or bar having an opaque light-reflecting coating at one end and throughout a major portion of its longitudinal outer surface area, thereby defining a relatively narrow longitudinal light-transmitting area; said light-transmitting area having lenses formed therein;
   b. a second normally light-transmitting rod or bar, spaced apart from said first rod or bar and having an opaque light-reflecting coating at one end and throughout a major portion of its longitudinal outer surface area, thereby defining a relatively narrow longitudinal light-transmitting area; said light-transmitting area having lenses formed therein;
   c. said first and second light-transmitting rods being positioned in an essentially common plane and so that the respective narrow lensed light-transmitting areas face each other across the intervening space therebetween;
   d. at least one of said normally light-transmitting rods or bars being pivotably movable about one end thereof to facilitate access to the space therebetween;
   e. means for producing and transmitting light into the uncoated end of said first normally light-transmitting rod or bar; and
   f. means for sensing the light reflected and transmitted out of the uncoated end of said second normally light-transmitting rod or bar.

2. Device as described in claim 1 in which said light-sensing means generates an electrical signal and further including:
   g. an electrical meter which measures the relative strength of said signal;
   h. an amplifier between said light-sensing means and said electrical meter; and
   i. a reel of magnetic recording tape interposed in the space intervening between the two rods or bars whereby said electrical meter provides a remote indication of the amount of tape on the said reel.

* * * * *